US012378901B2

(12) United States Patent
Shepherd et al.

(10) Patent No.: US 12,378,901 B2
(45) Date of Patent: Aug. 5, 2025

(54) OLIVIA CYCLE: SMR REACTOR COUPLING WITH UCG HYDROGEN PRODUCTION FOR ZERO EMISSION POWER GENERATION IN SOLID OXIDE FUEL CELLS

(71) Applicants: Dale Allen Shepherd, Stuart, FL (US); Radenko Stefanovic, Stuart, FL (US)

(72) Inventors: Dale Allen Shepherd, Stuart, FL (US); Radenko Stefanovic, Stuart, FL (US)

( * ) Notice: Subject to any disclaimer, the term of this patent is extended or adjusted under 35 U.S.C. 154(b) by 281 days.

(21) Appl. No.: 18/061,957

(22) Filed: Dec. 5, 2022

(65) Prior Publication Data

US 2024/0183288 A1 Jun. 6, 2024

(51) Int. Cl.
*F01K 3/18* (2006.01)
*G21D 9/00* (2006.01)

(52) U.S. Cl.
CPC ............... *F01K 3/181* (2013.01); *G21D 9/00* (2013.01); *C10J 2300/0966* (2013.01)

(58) Field of Classification Search
CPC ..... C10J 2300/0966; F01K 3/181; G21D 9/00
See application file for complete search history.

(56) References Cited

U.S. PATENT DOCUMENTS 4,183,405 A * 1/1980 Magnie ................. E21B 43/168 166/305.1
4,250,230 A * 2/1981 Terry ...................... E21B 43/40 166/266
5,202,194 A * 4/1993 VanBerg, Jr. ........... H01M 8/00 429/513
5,955,039 A * 9/1999 Dowdy .................... C10J 3/723 48/77
6,581,684 B2 * 6/2003 Wellington ........... E21B 43/247 166/267
6,686,079 B2 * 2/2004 Zhang ............... H01M 8/04089 429/444
7,803,473 B2 * 9/2010 Balan ................. H01M 8/04111 426/426
8,047,007 B2 * 11/2011 Zubrin .................... F01K 13/00 60/39.182
8,220,539 B2 * 7/2012 Vinegar ................... H01C 3/00 166/57

(Continued)

*Primary Examiner* — Jesse S Bogue

(57) ABSTRACT

This invention relates to a unique cycle for generating electricity at high efficiency and with zero carbon emissions. The cycle's fundamental energy carrier is hydrogen (H2), with H2 undergoing each unit process in the cycle either within water (H2O) molecules or as H2 gas. The heat source driving the cycle, through generation of steam, is a small nuclear reactor known in the industry as a small modular reactor (SMR). This steam's primary purpose is to provide the feed source for H2 production, which occurs in an Underground Coal Gasifier (UCG). The invention's high generation efficiency, accompanied by zero carbon emissions, derive from the UCG's steam/coal reactions and from conversion of the H2 into electricity by solid oxide fuel cells (SOFCs). These SOFCs produce, as their only waste stream, pure H2O. This H2O is then fed back for steam generation using the SMR's heat, which re-initiates the cycle. All unit processes use proven, commercially available technologies. The invention is directly applicable to any location where significant coal deposits exist.

6 Claims, 3 Drawing Sheets

*OLIVIA Process Flow Diagram*

(56) References Cited

U.S. PATENT DOCUMENTS

| | | | | |
|---|---|---|---|---|
| 9,343,187 | B2 * | 5/2016 | Ales | F22B 1/026 |
| 9,784,140 | B2 * | 10/2017 | Huntington | F01K 13/00 |
| 11,555,446 | B2 * | 1/2023 | Deng | F02C 6/10 |
| 11,817,228 | B2 * | 11/2023 | Su | F03D 9/11 |
| 12,087,979 | B2 * | 9/2024 | Singh | H01M 8/12 |
| 2013/0279640 | A1 * | 10/2013 | Berthold | G21C 1/32<br>376/254 |
| 2013/0336442 | A1 * | 12/2013 | Evans | G21C 15/16<br>376/384 |
| 2023/0391616 | A1 * | 12/2023 | Johnson | C01B 3/34 |
| 2024/0093582 | A1 * | 3/2024 | Weightman | E21B 41/00 |

* cited by examiner

*Figure 1. OLIVIA System Layout*
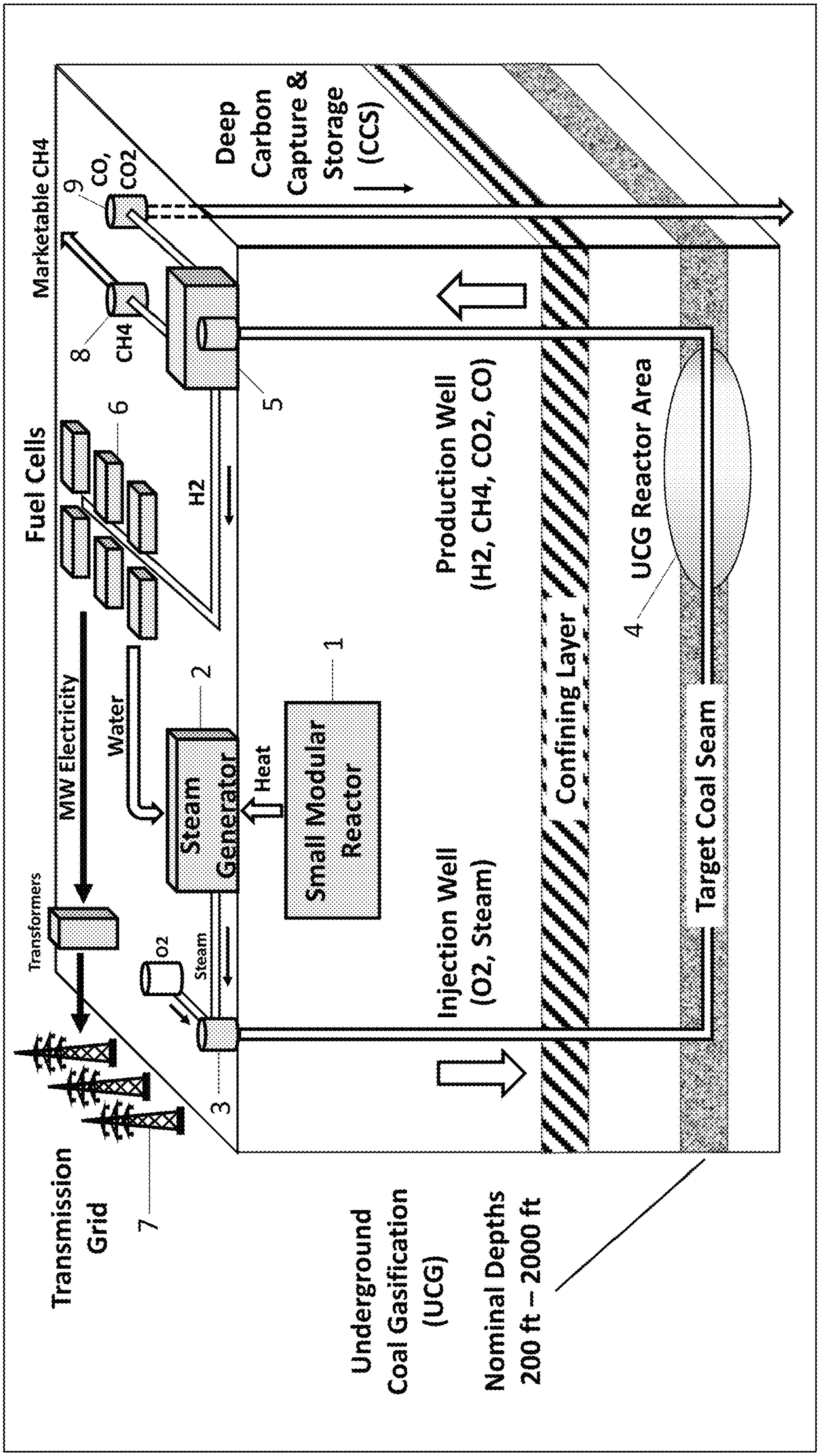

Figure 2. OLIVIA Process Flow Diagram
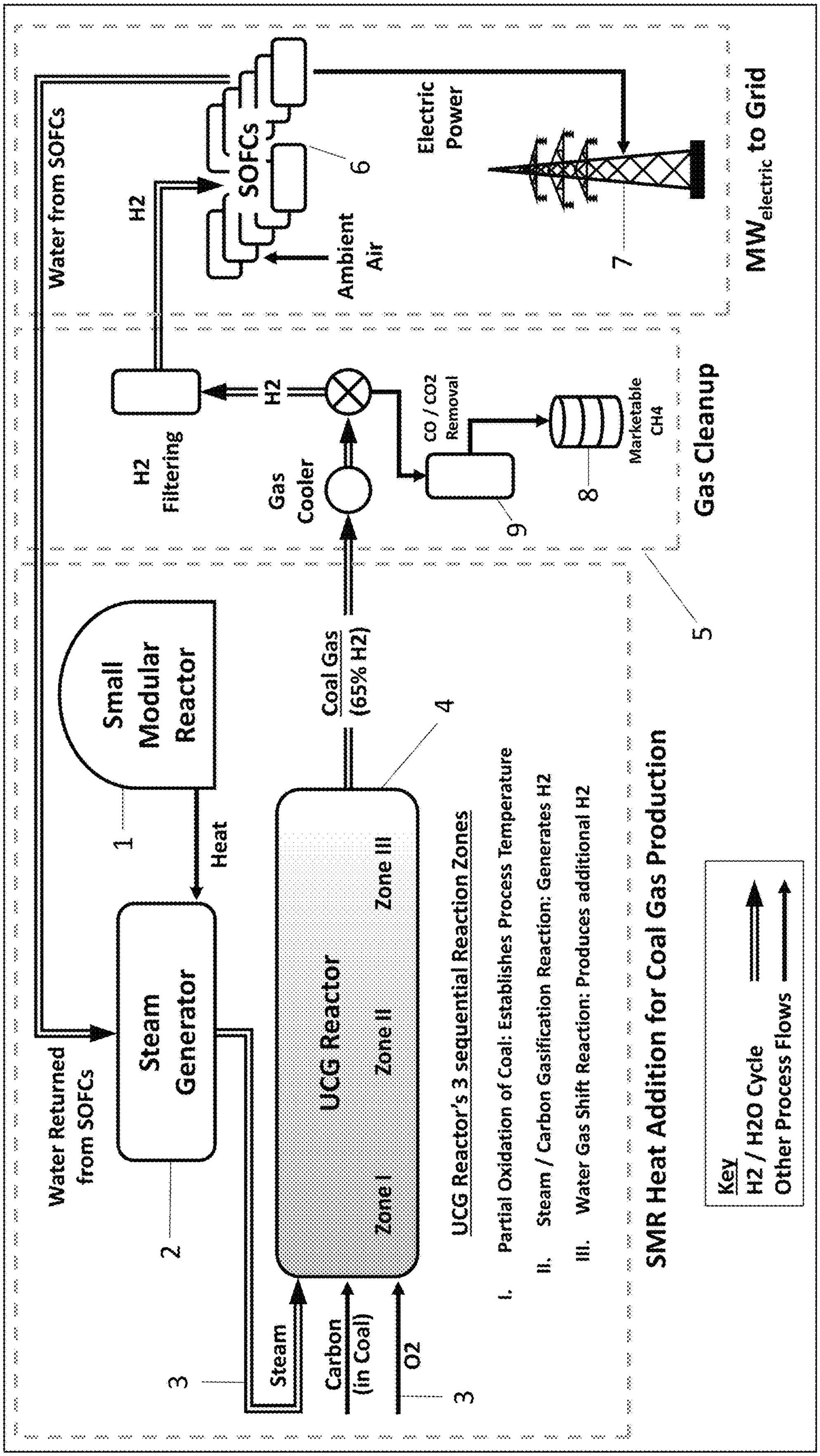

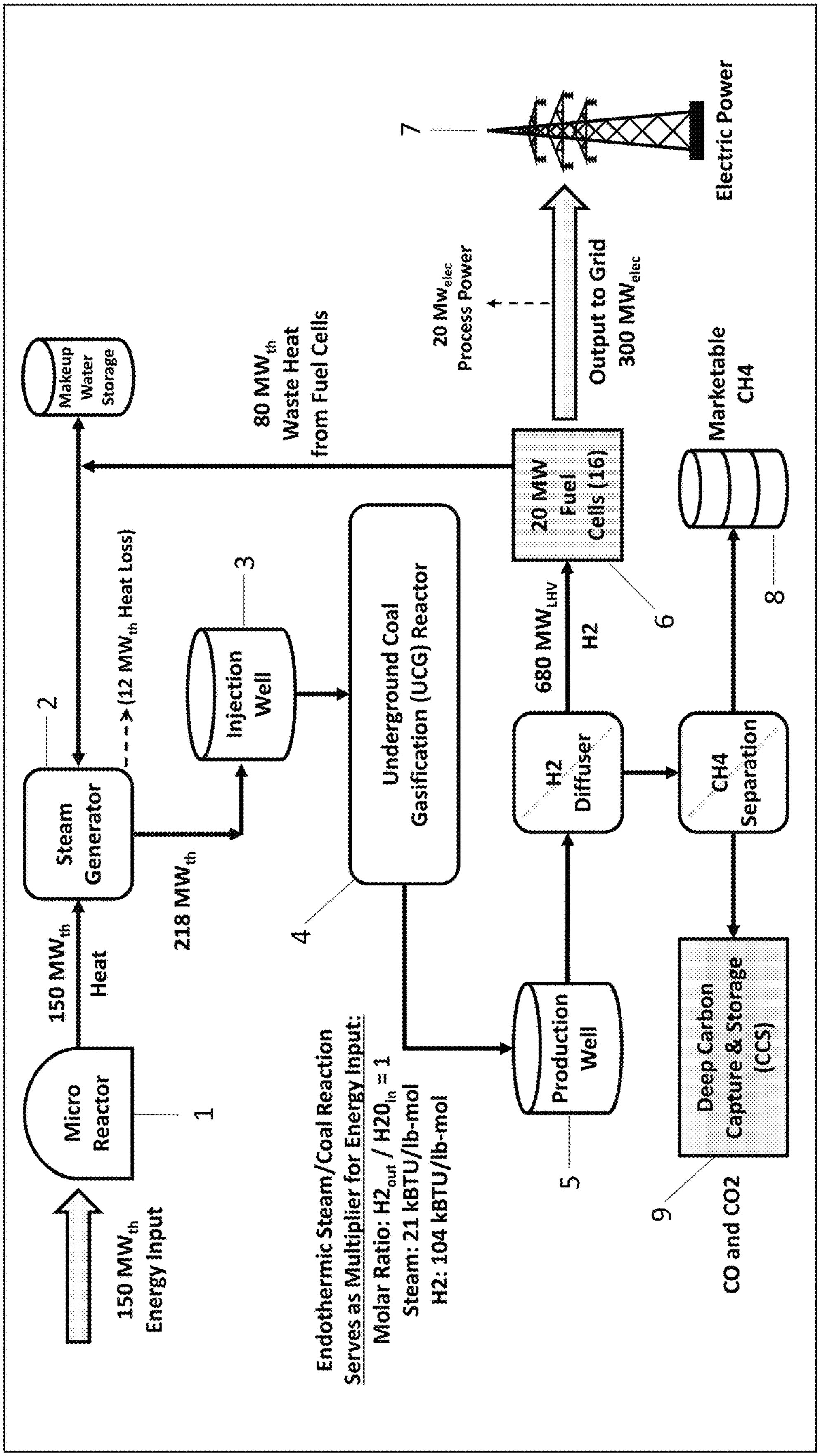
*Figure 3. OLIVIA Energy Balance*

OLIVIA CYCLE: SMR REACTOR COUPLING WITH UCG HYDROGEN PRODUCTION FOR ZERO EMISSION POWER GENERATION IN SOLID OXIDE FUEL CELLS

CROSS-REFERENCE TO RELATED APPLICATIONS

The present application claims the benefit of and priority to U.S. Provisional Patent Application (PPA) No. 63/374,902, filed on 7 Sep. 2022. The disclosure of this PPA is incorporated herein by reference in its entirety.

BACKGROUND/SUMMARY

Technical Field

The present disclosure relates to the field of establishing a thermodynamic cycle for production of electricity with zero carbon emissions, using H2 as the working element.

Background

Eighty percent of power generation in the U.S. today relies on either steam cycles or gas turbine cycles. Steam plants use heat from either nuclear reactors or fossil fuel combustion to produce steam. The steam then undergoes expansion across turbines, and these turbines drive generators. These steam cycles are known thermodynamically as Rankine cycles, and their efficiencies are limited to between 30% and 35%. Gas turbine cycles, although using hot combustion gas as the working fluid to drive a turbine, are also limited to this same efficiency range. This invention avoids these limits. Instead of producing steam or hot gas to spin a turbine, this invention introduces a cycle wherein 100% of SMR heat is used to produce steam with a different purpose: to react with coal seams deep underground in order to produce H2. This invention then uses the H2 aboveground to generate electricity in SOFCs.

Additionally, instead of relying on a combustion process that would involve carbon emissions, this invention relies on nuclear fission followed by a series of chemical oxidation and reduction reactions in order to generate electricity. Key to the overall cycle is the use of a coal vein, in-situ, as a tool for efficiently separating the world's most plentiful element, H2, from the oxygen (O2) bonded to it in H2O molecules. Although H2 is nature's most commonly occurring element, and although it is highly sought after to realize a carbon-free energy future, its intense bonding to O2 in the form of H2O provides a hurdle that has yet to be addressed in a feasible fashion for large scale electricity generation. This invention applies the chemistry fundamental that O2 in H2O molecules may be drawn to the coal's carbon by using a series of established chemical reactions between steam and coal. This invention performs this underground, in an UCG. The invention then uses the resulting H2 for efficient, carbon-free electricity generation.

While coal gasification is a mature technology, this gasification has previously been pursued primarily in order to produce and then burn methane (CH4). Such CH4 capture and burning inherently releases a significant fraction of carbon into the atmosphere, either as leaked CH4, or as the carbon dioxide (CO2) and carbon monoxide (CO) byproducts of combustion.

Contrary to the existing art of aboveground coal gasification, this invention releases zero CO or CO2 to the atmosphere. First, this cycle's SMR heat input releases zero carbon, since fission is a physics process void of emissions. Second, UCG generates the coal gases deep underground, avoiding direct interactions with the atmosphere. UCG-generated CO2 and CO are separated and returned to deep storage, where these gases will eventually combine with surrounding minerals to form an inert substance, limestone (CaCO3). H2 alone is conveyed to the SOFCs aboveground for electricity generation, with zero carbon emissions.

This invention provides two significant benefits relative to existing art power generation: (i) It delivers six times more electricity output than if the same quantity of SMR heat were supplied to either a Rankine or Brayton cycle, and (ii) equally as important is its environmental benefit, in that end-to-end this invention provides a process void of carbon emissions.

SUMMARY

It is axiomatic to engineers that improvement in thermodynamic efficiency for either a steam (Rankine) or gas turbine (Brayton) cycle is constrained by an efficiency upper limit known as the Carnot Efficiency. Simply stated, the Carnot limit expresses that such cycles must reject roughly twice as much waste heat as the amount of electrical energy they produce, in order to sustain their cycles. This invention's cycle, however, introduces a fundamentally different technology approach, one that results in six times more electrical energy produced than either a Rankine or Brayton cycle could achieve by using the same amount of heat energy input from the SMR heat source. This is due to two additive effects: (i) the additional energy that is provided to the working H2 by the endothermic chemical reactions between coal and steam in the UCG reactor, and (ii) the efficiency gain of using SOFCs' direct energy conversion technology instead of Carnot limited heat engines based on either the Rankine or Brayton cycles.

Accordingly, it is an objective of this invention to provide a power generation cycle that overcomes the Carnot efficiency limitations of Rankine and Brayton cycles. As opposed to using SMR heat input within either a Rankine or Brayton cycle per the existing art, and thereby only converting one third of the SMR's energy input into output electrical energy, our invention instead uses SMR heat input to drive endothermic chemical reactions within an UCG reactor. And by using SMR heat input solely to drive these H2 producing UCG reactions, the energy balance reveals that our invention's net electricity production is twice the SMR heat input. In comparison, this electricity production would only be one third of SMR heat input for Rankine or Brayton existing art. The UCG's steam/coal reactions effectively provide an energy multiplier.

It is also an objective of this invention to provide power generation with zero carbon emissions resulting from any unit process or component within the cycle. This derives primarily from use of an SMR for the cycle's input heat, and also from use of SOFCs to generate electricity. Neither technology relies on combustion, resulting in zero carbon emissions.

A third objective of this invention is to provide a power generation cycle that uses H2 as a working element in order to define the cycle, as opposed to Rankine and Brayton cycles which define the cycle in terms of a working fluid. Whereas Rankine cycles in the U.S. power generation industry use water as the working fluid, and while Brayton cycles use hot combustion gases, this invention uses H2 as the working element in its cycle.

Finally, it is an objective of this invention to integrate coal and nuclear energy sources together within a power generation cycle for the first time. This unique symbiosis results in generation of H2, which serves as the cycle's unit carrier of energy for electricity generation.

DESCRIPTION

Brief Description

The method and the system of this invention center around a proven concept. When coal is exposed to high temperature H2O in the form of steam, O2 in the H2O reacts with the coal's carbon and separates from the H2O. H2 from the H2O may then be recovered and used. This invention generates H2 underground in an UCG process, then uses the H2 to generate electricity in SOFCs, a technology proven to be both zero carbon-emitting and highly efficient. Although CO2 and CO are also generated by the UCG, they are captured and returned deep below grade where they eventually form a benign byproduct, limestone. Unlike coal gasification technologies designed to maximize CH4 production for its combustion, this invention's feed ratio of steam to O2 optimizes UCG production of H2, for supply to the SOFCs as a non-combusting fuel.

The key chemistry parameter that the invention keys on for control is O2. It is introduced to the coal seam via the injection well, both in the form of O2 gas and also within the injected steam's H2O molecules. The UCG reactions separate the O2 from H2O in the coal seams, with the coal essentially doing the work of separating O2 from H2O. For optimum H2 production, the ratio of steam feed to O2 feed in the injection well is 12:1. The end result is H2 alone being supplied to the SOFCs, with final disposition of all CO and CO2 being deep belowground. This provides the invention's name for the cycle: "O2 Left In-situ, Vacant In Above-grade flows" (OLIVIA).

Since an important objective of the invention to provide a method and a system for generating electricity without overall cycle productivity being bound by the conventional Carnot limitations of steam (Rankine) or gas turbine (Brayton) cycles, the current invention proposes an entirely different set of process steps. Whereas Rankine and Brayton cycles add heat to a working fluid, then convert a portion of this energy to mechanical work by a turbine, this invention uses a cycle where H2 cycles between states as either H2 gas or within H2O, compounded with O2. The energy of the H2 gas fed to the SOFCs derives not only from the SMR's heat input, but also from the coal as a result of the UCG's endothermic reactions. These UCG endothermic reactions, combined with use of SOFCs to convert H2 energy into electricity, account for OLIVIA's production of six times more electricity than either a Rankine or Brayton cycle would realize by using the same SMR heat input. In simple terms, to boost our H2's energy, we "let coal do the work". Once H2O's H2 is separated from O2 in these coal veins, H2's inherently high energy density is put to work in the SOFCs, a generation technology that is highly efficient due to its direct energy conversion mechanisms and whose only waste product is pure water.

In summary, by uniquely combining proven technology building blocks, the present invention advances the art of electrical power generation. The thermodynamic cycle used, "OLIVIA", creatively achieves unprecedented productivity while also realizing the elusive goal of zero carbon emissions.

BRIEF DESCRIPTION OF THE DRAWINGS

A clear understanding of the key features of the invention may be aided by reference to the appended drawings, which illustrate the method and system of the invention. These drawings depict preferred embodiments of the invention, but are not to be considered as limiting its scope with regard to other benefits which the invention is capable of achieving. Accordingly:

FIG. 1 provides an OLIVIA System Layout Diagram.

FIG. 2 provides an OLIVIA Process Flow Diagram.

FIG. 3 provides an OLIVIA Energy Flow Diagram.

DETAILED DESCRIPTION

FIG. 1 depicts the OLIVIA System Layout, with the major components described as follows. The SMR 1 serves as the process' driving heat source, with zero carbon emissions. A Steam Generator 2 adds SMR heat to H2O returned from the SOFCs, in order to generate steam. The Injection Well Head 3 delivers O2 and H2O (as steam) to the coal seam. The UCG 4 consists of a volumetric area in the coal seam where coal gases are produced. The Production Well Head 5 withdraws and separates coal gas into its H2, CH4, CO2 and CO components. SOFCs 6 efficiently produce carbon-free electricity, with pure H2O as their only "waste" byproduct. The SOFCs' output power, nominally at 10 kV to 20 kV but not limited to this range, has its voltage stepped up in transformers so that the power may be then supplied to a Transmission Grid 7. Nominally 4% of the coal gas volume consists of CH4, and this marketable CH4 is separated and stored for distribution 8. The CO2 and CO separated from the coal gas, 25% and 6% of coal gas by volume respectively, are captured and processed for deep storage 9.

FIG. 2 describes the Process Flows, maintaining the same numbering scheme as FIG. 1. The SMR 1 may use either water or air as a medium for providing heat to the Steam Generator. As a key feature of the invention, the Steam Generator produces steam that is used solely to generate coal gas in the UCG 4. In addition to conveying this steam, the Injection Well Head 3 also delivers O2 from a commercially available oxygen separation unit. This O2 is supplied for the partial oxidation of coal in Zone I of the UCG in order to establish the desired process temperature band of 1000 C to 1200 C for Zone I of the UCG. The UCG produces H2 gas from its three inputs: steam, O2 and the Coal Seam's carbon. The chemical reactions occur within three sequential UCG zones. Zone I partially oxidizes Coal in order to establish the desired process temperature, according to the Zone I reaction: C+O2→CO2+Heat. In Zone II, Coal and CO2 react to convert the CO2 to CO according to the Zone II reaction: C+CO2+Heat→2CO. Also in Zone II, Coal and Steam react to Generate H2 according to the Zone II reaction: C+H2O+Heat→CO+H2. Zone III's Water Gas Shift Reaction (WGSR) then produces additional H2 according to the Zone III reaction: CO+H2O+Heat→CO2+H2. By solving these equations' reaction rates, using standard equilibrium constants and assuming a steam:O2 feed ratio of 12:1, these Coal Gas volume fractions result: 65% H2, 25% CO2, 6% CO, and 4% CH4. These are nominal volume fractions, and actual fractions may vary depending on site-specific conditions. Separation of coal gas into its components occurs at the Recovery Well Head 5. Coal Gas is first cooled, then separated 8 into H2 and CH4 products, before capturing CO2 and CO in order to process them for deep storage 9. All of these unit processes are accomplished using proven, commercial-off-the-shelf technologies. The oxidation and reduction reactions within SOFCs are a proven and commercially available technology for generation of electricity 6, although to date SOFCs have yet to enjoy mass production. Their nominal efficiencies result in conversion of 47% of H2's lower heating value (LHV) into electricity. Aside from H2, the only other input is ambient air which provides the O2 source that SOFCs require in order to function. Once the SOFCs have converted these H2 and O2 inputs into MWs for the Grid, their only "waste" stream is H2O that contains recoverable heat. This H2O is then returned to the Steam Generators 2, where SMR heat will convert the H2O to steam and thus allowing the OL VIA cycle to repeat.

FIG. 3 is the OLIVIA Energy Flow Diagram, and it demonstrates the amount of electrical energy the OLIVIA Cycle can generate, relative to a given heat input (again, using same numbering scheme as FIG. 1). For modeling purposes, this specification assumes that the SMR 1 inputs 150 MW of heat to the process, which is a typical capacity rating for a commercially available SMR. As the OLIVIA cycle may use any heat input rating between 1 and 1000 MW, with the scaled results remaining identical to this 150 MW example, 150 MW is selected solely to illustrate the energy flows and loads throughout the OLIVIA cycle. Energy losses throughout the cycle are typical for the efficiency of each component. For example, the Steam Generator 2 is assumed to transfer 95% of the SMR heat to the water being converted to steam. The SOFCs 6 are assumed to convert 47% of the LHV of the H2 supplied to them into electricity. This is a typical value for SOFCs. Similarly, it is conservatively assumed that 22% of the SOFCs' waste heat may be recovered within the byproduct water that is returned in the cycle to the Steam Generator. The Energy Flow Diagram illustrates the key to the OLIVIA Cycle's capability to serve as an energy multiplier. When, in this typical example, 218 MW of steam are supplied to the UCG 4, the strongly endothermic steam/coal reactions go to work and provide OLIVIA's energy multiplier. The actual numbers are straightforward: balancing the chemical equations, the UCG's $H2_{out}/H20_{in}$ molar ratio is equal to 1. Since steam has 21 kBTU/lb-mol and H2 has 104 kBTU/lb-mol, then mole for mole H2 has roughly 5 times the heating value of H2O. Derating for efficiencies, we conservatively assume that only 80% of the coal seam is contacted/reacted with the steam and that only 75% of this contacted coal is carbon by weight. The result: 218 MW of steam converts to 680 MW of H2 lower heating value (LHV). Applying the SOFCs' 47% conversion efficiency to the 680 MW of H2 supplied, this results in 320 $MW_{elec}$ of electricity. A conservative 20 MW is assumed for powering the cycle's components, the two largest internal loads being an O2 separation unit for the injected O2, and the CO and CO2 capture units required for deep storage 9. This results in 300 MW of electricity for the Transmission Grid.

CONCLUSION

The result, a conservative one, shows that a 150 MW SMR used within the OLIVIA Cycle can generate 300 MW of electricity for the Grid. This must be compared to only 50 MW of electricity that the same 150 MW SMR would generate if used within a Rankine or Brayton cycle. These comparisons clearly demonstrate the power of using the SMR synergistically with coal, rather than letting the SMR work alone within an existing art steam or gas turbine cycle. Further, the OLIVIA cycle's zero carbon emissions must also be compared to significant emissions resulting from existing art steam or gas turbine plants burning fossil fuels.

While the present invention has been described in terms of particular details, in both summarized and detailed forms, it is not intended that these descriptions in any way limit its scope to any such details. It will be understood that many substitutions, changes and variations in the described details of the method and system illustrated herein, and of their operation, can be made by those skilled in the art without departing from the spirit of this invention.

The invention claimed is:

1. An H2 cycle for producing electricity with no accompanying carbon emissions, comprising a small modular nuclear reactor (SMR) as a heat source to drive the cycle, a Steam Generator to phase change water to steam using heat from the SMR, an Underground Coal Gasifier (UCG) to react this steam with in-situ coal to generate H2, Solid Oxide Fuel Cells (SOFCs) to generate electricity using the UCG-produced H2 as a fuel, and a recycle of the SOFCs' byproduct H2O back to the steam generator to repeat the cycle, where the cycle uses H2 as its working element, and wherein water supplied from the SOFCs to the Steam Generator is the sole water source for the cycle.

2. The process of claim 1 wherein SMR rated output may provide anywhere between 1 MW and 1000 MW for steam generation, and wherein the Steam Generator's output steam is at a temperature and pressure combination.

3. The process of claim 2, wherein reaction of steam and O2 with coal in the UCG occurs with the feed stream supplied at a steam: O2 ratio of 12 (+/−2).

4. The process of claim 2, wherein a first stage of the UCG is maintained at between 1000° C. and 1200° C. through controlled oxidation of the coal at the initial contact area of the feed stream with the UCG.

5. The process of claim 2, wherein the UCG's coal-gasifying conditions occur in a range between 1 and 100 atmospheres of pressure.

6. The process of claim 5, wherein resulting H2 gas is combined with O2 extracted from ambient air in SOFCs, and wherein these SOFCs have rated output between 1 and 1000 MW in total, at output AC voltages compatible with commercially available step-up transformers that may step up the SOFCs' output voltage for supply to a Transmission Grid.

* * * * *